(12) United States Patent
Ullyott et al.

(10) Patent No.: US 9,752,500 B2
(45) Date of Patent: Sep. 5, 2017

(54) GAS TURBINE ENGINE WITH TRANSMISSION AND METHOD OF ADJUSTING ROTATIONAL SPEED

(71) Applicant: PRATT & WHITNEY CANADA CORP., Longueuil (CA)

(72) Inventors: Richard Ullyott, Saint-Bruno (CA); Lazar Mitrovic, Longueuil (CA); Jean Dubreuil, Boucherville (CA); Stephen Christopher Kenny, Caledon Village (CA); Guy Bouchard, Mont St-Hilaire (CA); Ilya B. Medvedev, St. Petersburg (RU); Keith Morgan, Westmount (CA); Darius Jehangir Karanjia, Mississauga (CA); Nashed Azer Youssef, Mississauga (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 601 days.

(21) Appl. No.: 13/804,799

(22) Filed: Mar. 14, 2013

(65) Prior Publication Data

US 2014/0260295 A1    Sep. 18, 2014

(51) Int. Cl.
*F02C 3/107* (2006.01)
*F02C 3/113* (2006.01)
(Continued)

(52) U.S. Cl.
CPC .............. *F02C 3/113* (2013.01); *F02C 3/107* (2013.01); *F02C 7/36* (2013.01); *F02C 9/56* (2013.01); *F05D 2260/4031* (2013.01)

(58) Field of Classification Search
CPC .. F02C 3/107; F02C 3/113; F02C 3/36; F02C 7/36; F02C 9/56; F05D 2260/4031
(Continued)

(56) References Cited

U.S. PATENT DOCUMENTS 1,833,475 A * 11/1931 Standish ................. F16H 15/38
                                                           475/216
3,150,544 A    9/1964 Brass
(Continued)

FOREIGN PATENT DOCUMENTS

EP    2535544 A2    12/2012
EP    3135882 A1    3/2017

OTHER PUBLICATIONS

A New Approach to Turboshaft Engine Growth, M. A. Compagnon, General Electric Company, Lynn,Massachusetts pp. 80-41-1 to 80-41-6, May 13, 1980.

*Primary Examiner* — Pascal M Bui Pho
*Assistant Examiner* — Eric Linderman
(74) *Attorney, Agent, or Firm* — Norton Rose Fulbright Canada

(57) ABSTRACT

A gas turbine engine including at least one high pressure turbine rotor and at least one high pressure compressor rotor drivingly engaged to a rotatable high pressure spool, a low pressure spool rotatable independently of the high pressure spool, at least one low pressure turbine rotor drivingly engaged to the low pressure spool, and a rotatable load drivingly engaged to the low pressure spool. A fixed rotational speed ratio is defined between rotational speeds of the at high pressure turbine and compressor rotors. A fixed rotational speed ratio is defined between rotational speeds of the low pressure turbine rotor(s) and of the low pressure spool. A low pressure compressor rotor is in driving engagement with the low pressure spool through a variable transmission which defines a variable rotational speed ratio between the rotational speeds of the low pressure spool and of the low pressure compressor rotor.

19 Claims, 7 Drawing Sheets

(51) Int. Cl.
*F02C 7/36* (2006.01)
*F02C 9/56* (2006.01)

(58) Field of Classification Search
USPC .............................................. 476/50, 46, 40
See application file for complete search history.

(56) References Cited

U.S. PATENT DOCUMENTS

| | | | |
|---|---|---|---|
| 3,368,347 A | 2/1968 | Wickman | |
| 3,394,617 A * | 7/1968 | Dickenbrock | F16H 15/38 476/10 |
| 3,433,095 A | 3/1969 | Tuck | |
| 3,574,289 A * | 4/1971 | Scheiter | F16H 47/065 475/214 |
| 3,581,587 A * | 6/1971 | Dickenbrock | 476/40 |
| 3,585,795 A | 6/1971 | Grieb | |
| 3,611,834 A * | 10/1971 | Dison | F02C 7/36 475/343 |
| 3,641,766 A | 2/1972 | Uehling | |
| 3,710,576 A | 1/1973 | Evans et al. | |
| 3,739,658 A * | 6/1973 | Scheiter | F16H 47/08 475/214 |
| 3,965,684 A | 6/1976 | Nomura | |
| 4,008,628 A | 2/1977 | Orshansky, Jr. | |
| 4,018,045 A | 4/1977 | Greune et al. | |
| 4,064,690 A * | 12/1977 | Kronogard | F02C 3/103 60/39.163 |
| 4,118,927 A * | 10/1978 | Kronogard | F02C 7/36 60/39.163 |
| 4,122,732 A * | 10/1978 | Chana | F16H 47/04 477/69 |
| 4,186,554 A | 2/1980 | Possell | |
| 4,195,473 A | 4/1980 | Aspinwall | |
| 4,222,235 A * | 9/1980 | Adamson | F02C 6/003 60/226.1 |
| 4,251,987 A * | 2/1981 | Adamson | F02C 3/113 417/405 |
| 4,326,375 A * | 4/1982 | Kronogard | F02C 7/36 475/31 |
| 4,354,401 A * | 10/1982 | Omitsu | F16H 47/065 475/60 |
| 4,355,547 A * | 10/1982 | Poole | F16H 15/38 475/217 |
| 4,412,460 A | 11/1983 | Barthelemy | |
| 4,458,561 A * | 7/1984 | Frank | B60W 10/06 477/43 |
| 4,632,337 A | 12/1986 | Moore | |
| 4,751,816 A * | 6/1988 | Perry | F02K 3/072 416/129 |
| 4,782,658 A * | 11/1988 | Perry | F02C 7/047 60/226.1 |
| 4,827,712 A * | 5/1989 | Coplin | F02K 3/06 415/210.1 |
| 4,858,428 A | 8/1989 | Paul | |
| 4,858,493 A * | 8/1989 | Cordner | F16H 3/663 475/127 |
| 4,916,894 A * | 4/1990 | Adamson | F02C 3/107 416/171 |
| 4,936,748 A * | 6/1990 | Adamson | F02C 6/206 416/123 |
| 4,969,325 A * | 11/1990 | Adamson | F02C 3/067 416/129 |
| 5,010,729 A * | 4/1991 | Adamson | F02C 3/067 416/129 |
| 5,011,464 A | 4/1991 | White | |
| 5,011,465 A | 4/1991 | Jeffries et al. | |
| 5,033,996 A | 7/1991 | Frey | |
| 5,103,631 A * | 4/1992 | Edwards | F02C 3/107 60/39.163 |
| 5,125,806 A * | 6/1992 | Quick | F04D 25/04 417/212 |
| 5,328,419 A | 7/1994 | Moti et al. | |
| 5,345,760 A | 9/1994 | Giffin, III | |
| 5,577,973 A | 11/1996 | Schmidt | |
| 5,694,567 A | 12/1997 | Bourekas et al. | |
| 5,694,768 A * | 12/1997 | Johnson | F02K 3/075 60/226.3 |
| 5,782,433 A * | 7/1998 | Goi | B64C 27/14 244/60 |
| 5,842,945 A * | 12/1998 | Inoue | F16H 15/38 475/207 |
| 5,873,800 A | 2/1999 | Maslow et al. | |
| 6,042,499 A * | 3/2000 | Goi | B64C 27/12 475/214 |
| 6,053,452 A | 4/2000 | Yamakawa et al. | |
| 6,082,967 A * | 7/2000 | Loisy | F02C 3/113 415/68 |
| 6,158,210 A * | 12/2000 | Orlando | F02C 3/067 29/889.2 |
| 6,254,504 B1 | 7/2001 | Goi et al. | |
| 6,302,356 B1 * | 10/2001 | Hawkins | B64C 27/12 244/17.11 |
| 6,364,249 B1 * | 4/2002 | Morgan et al. | 244/17.11 |
| 6,494,806 B2 * | 12/2002 | Tsukada et al. | 476/8 |
| 6,497,634 B1 * | 12/2002 | Bode | F16H 3/42 474/139 |
| 6,524,068 B2 | 2/2003 | Carter, Jr. | |
| 6,607,357 B2 | 8/2003 | Caramaschi | |
| 6,695,254 B2 | 2/2004 | Zoppitelli et al. | |
| 6,739,120 B2 * | 5/2004 | Moniz | F01D 5/022 60/226.1 |
| 6,763,654 B2 * | 7/2004 | Orlando | F01D 1/24 415/69 |
| 6,895,741 B2 | 5/2005 | Rago | |
| 7,044,877 B2 | 5/2006 | Ai | |
| 7,107,972 B1 | 9/2006 | Jones et al. | |
| 7,107,973 B1 | 9/2006 | Jones et al. | |
| 7,115,066 B1 | 10/2006 | Lee | |
| 7,296,767 B2 | 11/2007 | Palcic et al. | |
| 7,396,209 B2 | 7/2008 | Miller et al. | |
| 7,422,543 B2 | 9/2008 | Ransbarger et al. | |
| 7,481,062 B2 | 1/2009 | Gaines et al. | |
| 7,490,461 B2 * | 2/2009 | Moniz | F02K 3/072 415/9 |
| 7,513,120 B2 | 4/2009 | Kupratis | |
| 7,526,913 B2 * | 5/2009 | Orlando | F01D 1/26 415/9 |
| 7,552,582 B2 * | 6/2009 | Eick | F02C 3/107 60/39.163 |
| 7,563,192 B2 * | 7/2009 | Imanishi et al. | 476/8 |
| 7,603,844 B2 * | 10/2009 | Moniz | F01D 21/04 415/174.4 |
| 7,628,355 B2 | 12/2009 | Palcic et al. | |
| 7,651,050 B2 | 1/2010 | Lappos et al. | |
| 7,685,808 B2 * | 3/2010 | Orlando | F02C 7/36 60/226.1 |
| 7,690,185 B2 | 4/2010 | Linet et al. | |
| 7,698,884 B2 * | 4/2010 | Maguire | F02C 3/107 60/39.163 |
| 7,707,909 B2 | 5/2010 | Linet et al. | |
| 7,727,106 B2 * | 6/2010 | Maheu et al. | 476/1 |
| 7,727,110 B2 | 6/2010 | Miller et al. | |
| 7,740,556 B2 * | 6/2010 | Iwase et al. | 476/10 |
| 7,758,302 B2 | 7/2010 | Linet et al. | |
| 7,942,079 B2 * | 5/2011 | Russ | F02C 7/32 60/39.15 |
| 7,942,365 B2 | 5/2011 | Palcic et al. | |
| 7,942,635 B1 * | 5/2011 | Murray | F01D 5/026 415/142 |
| 8,015,798 B2 * | 9/2011 | Norris | F02C 3/107 60/226.1 |
| 8,063,528 B2 * | 11/2011 | Toot | H02K 16/02 310/114 |
| 8,104,262 B2 * | 1/2012 | Marshall | F02K 1/09 239/265.19 |
| 8,181,442 B2 | 5/2012 | Youssef | |
| 8,191,352 B2 * | 6/2012 | Schilling | F02C 3/107 415/65 |
| 8,292,570 B2 * | 10/2012 | Suciu | F01D 5/026 415/68 |

(56) References Cited

U.S. PATENT DOCUMENTS

| | | | | |
|---|---|---|---|---|
| 8,365,514 B1* | 2/2013 | Kupratis | F02K 3/06 | 60/226.1 |
| 8,375,695 B2* | 2/2013 | Schilling | F01D 15/10 | 310/114 |
| 8,439,631 B2* | 5/2013 | Bartolomeo | F02C 7/32 | 415/122.1 |
| 8,500,583 B2* | 8/2013 | Goi | F02C 7/275 | 475/5 |
| 8,517,672 B2* | 8/2013 | McCooey | F02C 3/107 | 415/122.1 |
| 8,561,383 B2 | 10/2013 | Suciu et al. | | |
| 8,590,286 B2* | 11/2013 | Roberge | F01D 1/023 | 60/226.1 |
| 8,869,504 B1* | 10/2014 | Schwarz | F02K 1/09 | 60/226.1 |
| 8,956,108 B2* | 2/2015 | Eleftheriou | F02K 3/06 | 415/122.1 |
| 9,145,834 B2* | 9/2015 | Frost | F02C 7/32 | |
| 9,316,159 B2* | 4/2016 | Dubreuil | F02C 7/36 | |
| 2002/0189231 A1* | 12/2002 | Franchet | F02C 3/113 | 60/226.1 |
| 2003/0115885 A1 | 6/2003 | MacFarlane et al. | | 60/793 |
| 2003/0232692 A1 | 12/2003 | Chen | | |
| 2004/0043856 A1 | 3/2004 | Xiaolan | | |
| 2004/0255590 A1* | 12/2004 | Rago | F01D 15/10 | 60/772 |
| 2004/0266580 A1 | 12/2004 | Stevenson | | |
| 2005/0132693 A1* | 6/2005 | Macfarlane et al. | | 60/39.08 |
| 2006/0010875 A1 | 1/2006 | Mahoney et al. | | |
| 2006/0205553 A1* | 9/2006 | Lee | F16H 3/727 | 475/5 |
| 2006/0236675 A1* | 10/2006 | Weiler | F02C 3/067 | 60/226.1 |
| 2007/0084186 A1* | 4/2007 | Orlando | F02C 3/107 | 60/204 |
| 2007/0084190 A1* | 4/2007 | Moniz | F02C 7/36 | 60/204 |
| 2007/0087892 A1* | 4/2007 | Orlando | F02C 3/067 | 475/348 |
| 2007/0214786 A1* | 9/2007 | Arndt | F02B 41/10 | 60/600 |
| 2007/0265761 A1* | 11/2007 | Dooley | F02C 7/32 | 701/100 |
| 2008/0060341 A1* | 3/2008 | Loisy | F02C 3/113 | 60/226.1 |
| 2008/0098712 A1 | 5/2008 | Sheridan | | |
| 2008/0120839 A1* | 5/2008 | Schilling | F02C 3/107 | 29/888.02 |
| 2008/0138195 A1* | 6/2008 | Kern | F02C 3/113 | 415/122.1 |
| 2008/0148881 A1* | 6/2008 | Moniz | F02C 7/32 | 74/15.6 |
| 2008/0223640 A1 | 9/2008 | Clauson | | |
| 2009/0028739 A1* | 1/2009 | Velitsko | F01C 1/123 | 418/191 |
| 2009/0139243 A1* | 6/2009 | Winter | F02C 7/32 | 60/802 |
| 2009/0272121 A1* | 11/2009 | Youssef | | 60/784 |
| 2009/0293445 A1 | 12/2009 | Ress, Jr. | | |
| 2009/0320491 A1* | 12/2009 | Copeland | F02C 7/277 | 60/772 |
| 2010/0093476 A1 | 4/2010 | Carter et al. | | |
| 2010/0199666 A1* | 8/2010 | Vandyne et al. | | 60/605.2 |
| 2010/0219779 A1 | 9/2010 | Bradbrook | | |
| 2010/0223904 A1* | 9/2010 | Edwards | F02C 3/067 | 60/224 |
| 2011/0036089 A1* | 2/2011 | Triller | F02B 37/10 | 60/608 |
| 2011/0185698 A1* | 8/2011 | Morgan et al. | | 60/39.24 |
| 2011/0314788 A1* | 12/2011 | Marche | B64D 27/16 | 60/39.01 |
| 2012/0051883 A1* | 3/2012 | D'Ercole | F02C 3/107 | 415/65 |
| 2012/0117940 A1* | 5/2012 | Winter | F02C 7/32 | 60/226.3 |
| 2012/0275898 A1* | 11/2012 | McCaffrey | F01D 11/18 | 415/1 |
| 2012/0317991 A1 | 12/2012 | Frost et al. | | |
| 2013/0000317 A1* | 1/2013 | Berryann | F01D 19/00 | 60/778 |
| 2013/0095974 A1* | 4/2013 | Imai | F16H 57/0479 | 475/159 |
| 2013/0098058 A1* | 4/2013 | Sheridan | F02C 7/32 | 60/783 |
| 2013/0104524 A1* | 5/2013 | Kupratis | F02K 3/04 | 60/226.1 |
| 2013/0192266 A1* | 8/2013 | Houston | F02K 3/06 | 60/805 |
| 2013/0195621 A1* | 8/2013 | Schwarz | F01D 25/162 | 415/118 |
| 2013/0199156 A1* | 8/2013 | Ress, Jr. | F02C 3/113 | 60/224 |
| 2013/0219856 A1* | 8/2013 | Suciu | F02K 3/072 | 60/226.1 |
| 2013/0223986 A1* | 8/2013 | Kupratis | F02C 7/36 | 415/115 |
| 2013/0259651 A1* | 10/2013 | Kupratis | F02C 3/113 | 415/122.1 |
| 2013/0324343 A1* | 12/2013 | Gallet | F02C 3/107 | 475/159 |
| 2013/0327060 A1* | 12/2013 | Christians | F02C 7/36 | 60/805 |
| 2014/0157756 A1* | 6/2014 | Hasel | F02C 3/107 | 60/226.1 |
| 2014/0208760 A1* | 7/2014 | Dubreuil et al. | | 60/772 |
| 2014/0223901 A1* | 8/2014 | Versteyhe | F02B 37/105 | 60/605.1 |
| 2014/0250860 A1* | 9/2014 | Sidelkovskiy | F02C 3/107 | 60/39.15 |
| 2014/0271135 A1* | 9/2014 | Sheridan | F02C 7/36 | 415/122.1 |
| 2014/0290265 A1* | 10/2014 | Ullyott et al. | | 60/773 |
| 2015/0027101 A1* | 1/2015 | Hasel | F02K 3/06 | 60/226.1 |
| 2015/0176486 A1* | 6/2015 | Menheere et al. | | 60/774 |
| 2015/0300248 A1* | 10/2015 | Schneider | F02C 3/04 | 60/805 |
| 2016/0040601 A1* | 2/2016 | Frost | F02C 7/32 | 415/122.1 |
| 2016/0047305 A1* | 2/2016 | Wickert | F02C 3/107 | 415/199.5 |
| 2016/0061057 A1* | 3/2016 | Lord | F01D 5/141 | 415/122.1 |
| 2016/0069297 A1* | 3/2016 | Sawyers-Abbott | F02K 1/72 | 415/69 |
| 2016/0167789 A1* | 6/2016 | Knight | B64D 13/02 | 454/71 |
| 2016/0167790 A1* | 6/2016 | Hipsky | F02K 3/00 | 74/15.4 |
| 2016/0195096 A1* | 7/2016 | Otto | F02K 3/06 | 415/1 |
| 2016/0222888 A1* | 8/2016 | Sheridan | F02C 7/36 | |
| 2016/0230674 A1* | 8/2016 | Schwarz | F02C 3/04 | |

* cited by examiner

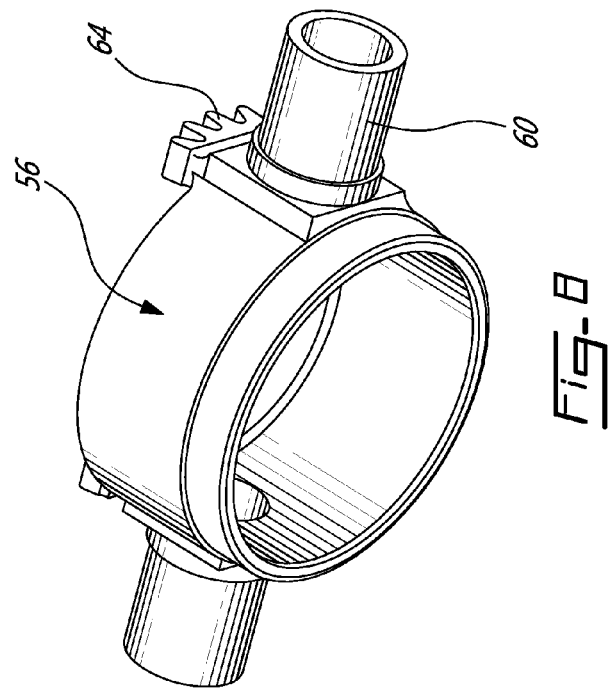
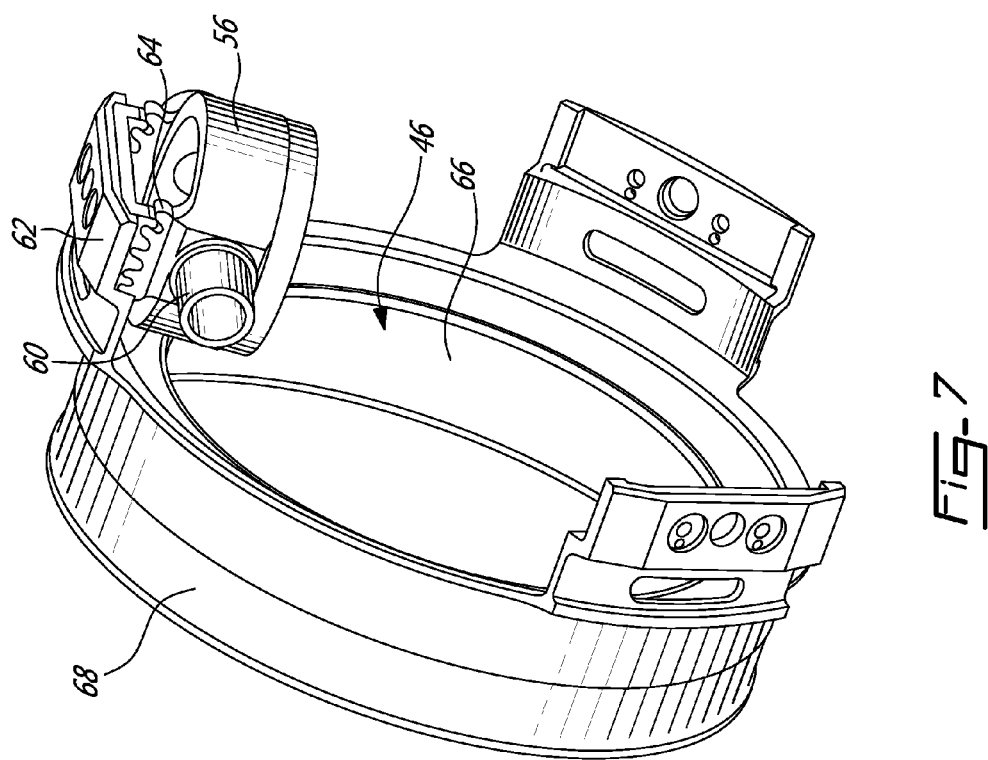

GAS TURBINE ENGINE WITH TRANSMISSION AND METHOD OF ADJUSTING ROTATIONAL SPEED

TECHNICAL FIELD

The application relates generally to gas turbine engines and, more particularly, to a gas turbine engine having a transmission.

BACKGROUND OF THE ART

In gas turbine engines, the low pressure or booster compressor rotor(s) are typically driven by the low pressure spool either by direct connection thereto such that they rotate at a same rotational speed, or through a fixed ratio gearbox. However, the speed of the low pressure spool is usually determined by the load requirements of the engine, whether the load includes a fan, an output shaft, a propeller, or any other adequate type of rotatable load. In particular for turboprop, turboshaft or APU engines, the rotatable load may be required to rotate at a constant or approximately constant rotational speed throughout a range of power demands.

In addition, because power demands on the engine vary, for example between take-off and cruise conditions, the turbine and compressor rotors of the core section typically have to rotate at a relatively large range of rotational speeds. For example, low power requirement conditions may require the rotors of the core section to rotate relatively far below their optimal rotational speed. This in turn may affect the rotational speed of the low pressure turbine rotor(s), and as such of the low pressure spool and associated low pressure compressor rotor(s), which may limit the engine's efficiency in such conditions.

SUMMARY

In one aspect, there is provided a method of adjusting a rotational speed of at least one low pressure compressor rotor of a gas turbine engine having independently rotatable low pressure and high pressure spools, the method comprising: rotating at least one rotor of a high pressure compressor of a core section of the engine with at least one rotor of a high pressure turbine of the core section through the high pressure spool; rotating at least one rotor of a low pressure turbine with a flow of exhaust gases from the high pressure turbine section; rotating the low pressure spool with the at least one rotor of the low pressure turbine; rotating a load of the engine with the low pressure spool; driving a rotation of the at least one low pressure compressor rotor with the low pressure spool through a variable transmission defining a variable transmission ratio between rotational speeds of the at least one compressor rotor and of the low pressure spool; and adjusting the transmission ratio to obtain a desired rotational speed for the low pressure compressor rotor.

In another aspect, there is provided a method of adjusting rotational speeds of a gas turbine engine having independently rotatable low pressure and high pressure spools, the method comprising: selecting a first rotational speed for at least one high pressure compressor rotor and at least one high pressure turbine rotor of a core of the gas turbine engine; rotating the at least one high pressure compressor rotor with the at least one high pressure turbine rotor through the high pressure spool at the first rotational speed, a ratio between the first rotational speed and a rotational speed of the high pressure spool having a fixed value; selecting a second rotational speed for a load of the engine; selecting a third rotational speed for at least one low pressure compressor rotor of the engine; and adjusting a variable ratio of a transmission drivingly interconnecting the low pressure spool and the at least one low pressure compressor rotor to rotate the at least one low pressure compressor rotor at the third rotational speed while rotating the load at the second rotational speed with at least one low pressure turbine rotor of the engine through the low pressure spool, a ratio between the second rotational speed and a rotational speed of the low pressure spool having a fixed value.

In a further aspect, there is provided a gas turbine engine comprising: a core engine having at least one high pressure turbine rotor and at least one high pressure compressor rotor connected to a rotatable high pressure spool such as to be in driving engagement therewith with a fixed rotational speed ratio being defined therebetween; a low pressure spool rotatable independently of the high pressure spool; at least one low pressure turbine rotor connected to the low pressure spool such as to be in driving engagement therewith with a fixed rotational speed ratio being defined therebetween, the at least one low pressure turbine rotor extending in a flowpath in fluid communication with a flowpath receiving the at least one high pressure turbine rotor; a rotatable load in driving engagement with the low pressure spool; and a low pressure compressor rotor extending in a flowpath in fluid communication with a flowpath receiving the at least one high pressure compressor rotor, the low pressure compressor rotor being in driving engagement with the low pressure spool through a variable transmission defining a variable rotational speed ratio therebetween.

DESCRIPTION OF THE DRAWINGS

Reference is now made to the accompanying figures in which:

FIG. 7 is a schematic tridimensional view of an actuation mechanism and a disc support of the part of the transmission shown in FIG. 5; and FIG. 8 is a schematic cross sectional view of the disc support of FIG. 7.

DETAILED DESCRIPTION

The present application is related to U.S. application Ser. Nos. 13/754,045 and 13/754,304, both of which were filed Jan. 30, 2013, the entire contents of both of which are incorporated by reference herein.

Figure 1:
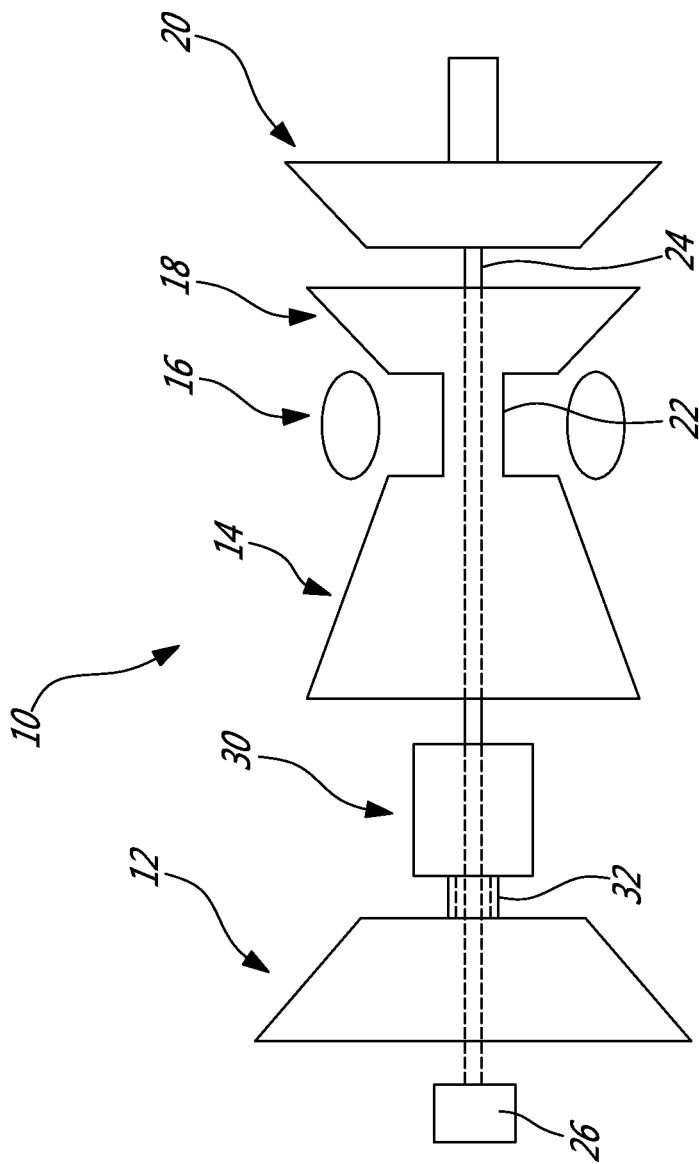
FIG. 1 is a schematic cross-sectional view of a gas turbine engine having a transmission in accordance with a particular embodiment.

FIG. 1 schematically illustrates a gas turbine engine 10 of a type preferably provided for use in subsonic flight, generally comprising in serial flow communication a low pressure or booster compressor section 12 and a high pressure compressor section 14 for pressurizing the air, a combustor 16 in which the compressed air is mixed with fuel and ignited for generating an annular stream of hot combustion gases, and a high pressure turbine section 18 and low pressure or power turbine section 20 for extracting energy from the combustion gases.

The engine 10 includes a high pressure shaft or spool 22 interconnecting the rotors of the high pressure turbine and compressor sections 18, 14, such that a core engine is defined by the high pressure turbine and compressor sections 18, 14 and the combustor 16. The engine further includes a low pressure/power shaft or spool 24 to which the rotor(s) of the low pressure turbine section 20 are connected, such that the rotor(s) of the low pressure turbine section 20 drive the rotation of the low pressure spool 24. The low pressure spool 24 is in driving engagement with the rotor(s) of the low pressure compressor section 12 and with a rotatable load 26, as will be further detailed below. The rotatable load 26 is driven by the low pressure spool 24 with a fixed ratio between their rotational speeds.

The two spools 22, 24 are free to rotate independently from one another. In a particular embodiment, the high pressure spool 22 is hollow and the low pressure spool 24 extends therethrough. The engine 10 further includes a variable transmission 30 driven by the low pressure spool 24 and driving a rotatable transmission shaft 32. In a particular embodiment, the transmission shaft 32 is hollow and the low pressure spool 24 extends therethrough.

The engine 10 schematically illustrated in FIG. 1 can be any type of gas turbine engine. In a particular embodiment shown in FIG. 2, the gas turbine engine 10 is a turboshaft or turboprop engine, and in the particular embodiment of FIG. 3, the gas turbine engine 10 is a turbofan engine. Referring to the embodiments of FIGS. 2-3, in each case the high pressure compressor section 14 includes at least one high pressure compressor rotor 114 directly connected to the high pressure spool 22. The high pressure turbine section 18 includes at least one turbine rotor 118 also directly connected to the high pressure spool 22. The high pressure compressor and turbine rotors 114, 118 are directly engaged to the high pressure spool 22, so that they rotate at a same rotational speed. Alternately, the high pressure compressor rotor(s) 114 and/or the high pressure turbine rotor(s) 118 may be engaged to the high pressure spool 22 such that they rotate at a different rotational speed having a fixed ratio with respect to the rotational speed of the high pressure spool 22, for example by engagement through a fixed ratio transmission (not shown).

Figure 2:
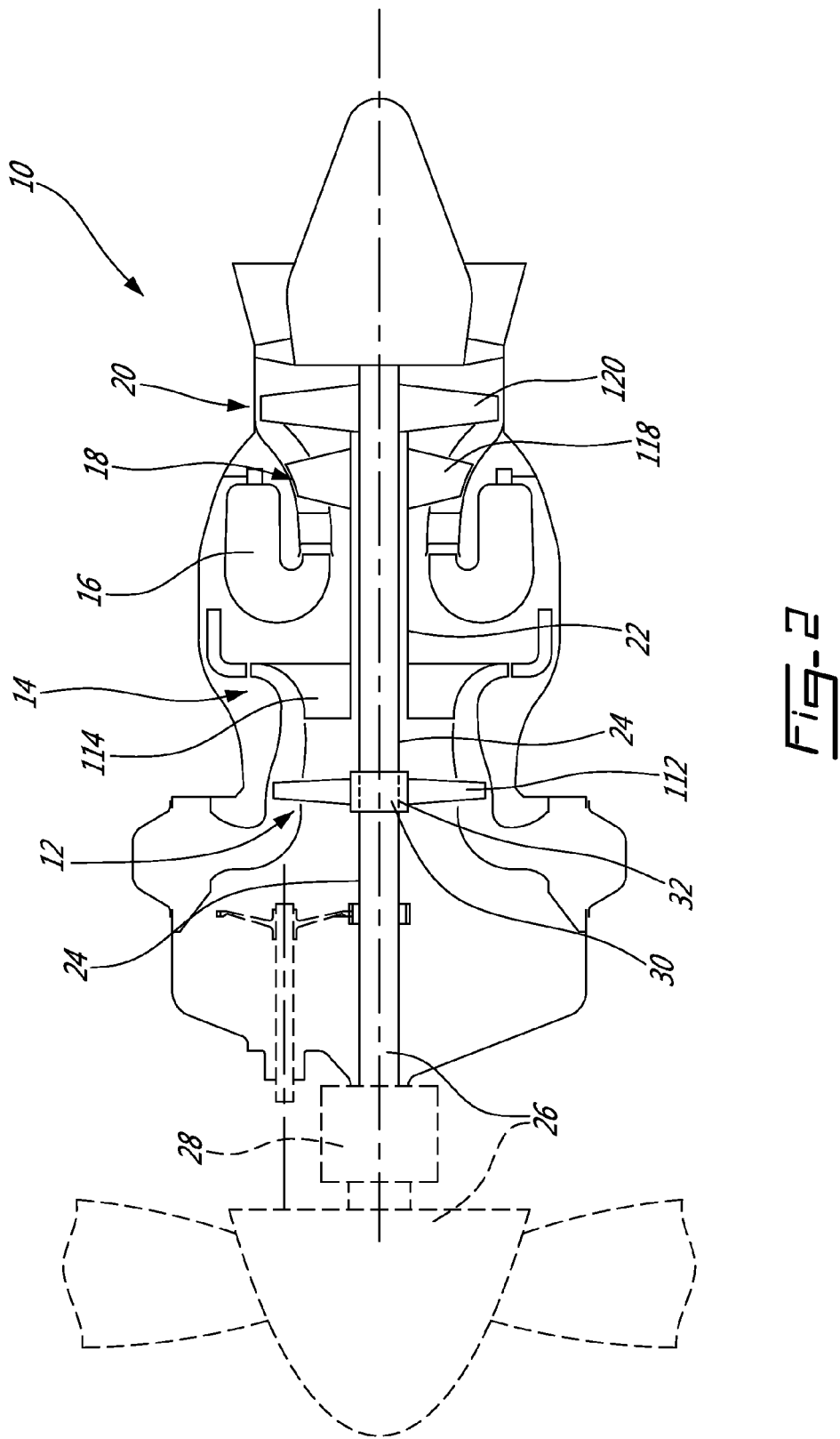
FIG. 2 is a schematic cross sectional view of an exemplary gas turbine engine such as that shown in FIG. 1.
Figure 3:
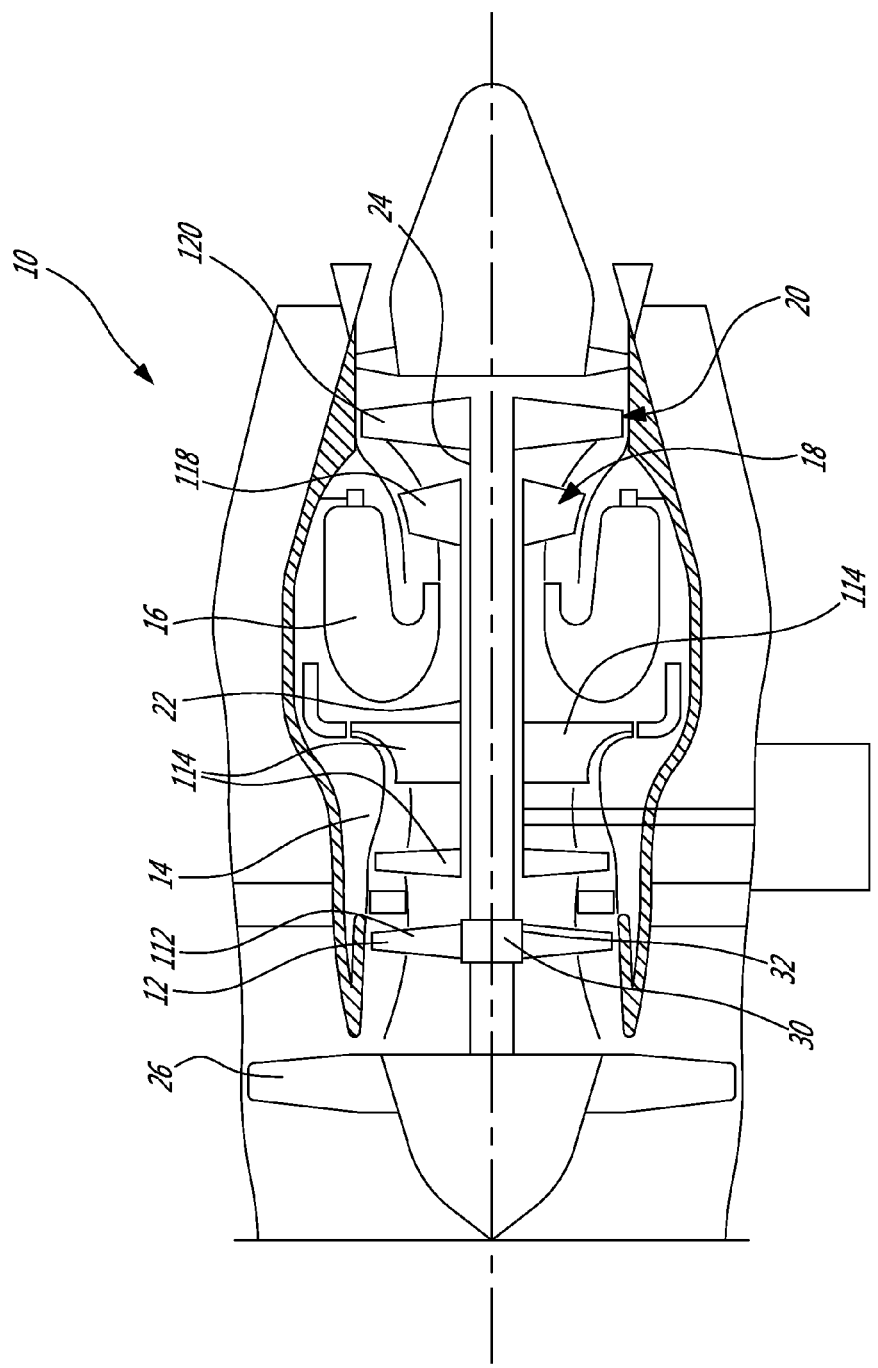
FIG. 3 is a schematic cross sectional view of another exemplary gas turbine engine such as that shown in FIG. 1.

Still referring to the embodiments of FIGS. 2-3, the low pressure turbine 20 includes at least one low pressure turbine rotor 120 directly connected to the low pressure spool 24 so that they rotate at a same rotational speed. The rotatable load 26 may include for example an output shaft (in full lines in FIG. 2) which the embodiment shown is an extension of the low pressure spool 24 extending through the transmission 30 and the transmission shaft 32, a propeller (in dotted lines in FIG. 2) which in the embodiment shown is driven by the low pressure spool 24 through a gearbox 28, or a fan (FIG. 3). Other configurations are also possible.

Still referring to the embodiments of FIGS. 2-3, the low pressure compressor section 12 includes at least one low pressure compressor rotor 112 connected to the transmission shaft 32 to be drivingly engaged to the low pressure spool 24 through the transmission 30. The transmission 30 is variable transmission, i.e. a transmission having a variable transmission ratio. In a particular embodiment, the transmission is a continuously variable transmission. The transmission 30 thus allows for a variation of the rotational speed of the low pressure compressor rotor(s) 112 connected thereto while keeping the rotational speed of the turbine sections 18, 20 substantially constant. Although not shown, the low pressure compressor section 12 may additionally include one or more rotors directly connected to the low pressure spool 24 so that they rotate at a same rotational speed.

It is understood that the particular engine configurations of FIGS. 2-3 are shown as an example only and that other engine configurations may be used. For example, the engine may be an auxiliary power unit (APU) or a land-based gas turbine engine. The low pressure spool and high pressure spools may extend separately to define an engine having a rear drive. The low pressure compressor rotor may be engaged to the low pressure spool with the transmission 30 through a connecting shaft engaged to the low pressure spool and extending along a different axis than the low and high pressure spools or extending through the high pressure spool, etc.

Referring to FIG. 4-7, in a particular embodiment, the transmission 30 is a continuously variable transmission generally including an input drive member 40 engaged to the low pressure spool 24, a compressor drive member 42 engaged to the rotor(s) 112 of the low pressure compressor section 12, at least one movable member 44 engaged to the drive members 40, 42 with a variable relative position (e.g. variable relative location and/or variable relative orientation) determining the variable ratio between the rotational speeds of the drive members 40, 42, and an actuation mechanism 46 connected to the movable member 44 and determining its position.

In the embodiment shown, the input drive member 40 is a drive disc defining a toroidal engagement surface 140 and the compressor drive member 42 is also a drive disc defining a toroidal engagement surface 142 facing the engagement surface 140 of the input drive member 40, but spaced apart therefrom. Three circumferentially spaced apart movable members 44 in the form of idler discs drivingly engage the toroidal engagement surfaces 140, 142. Each idler disc 44 is supported by a respective disc support 56 (shown in isolation in FIG. 8) which is in turn pivotally supported such as to allow a tilting movement of each idler disc 44 with respect to the radial direction of the engine 10, for example by two coaxial opposing pins 60 radially extending from a body of the support along a same axis. One or more bearing(s) 58 connect each idler disc 44 to the respective support 56 to allow rotation of the idler disc 44.

Figure 4:
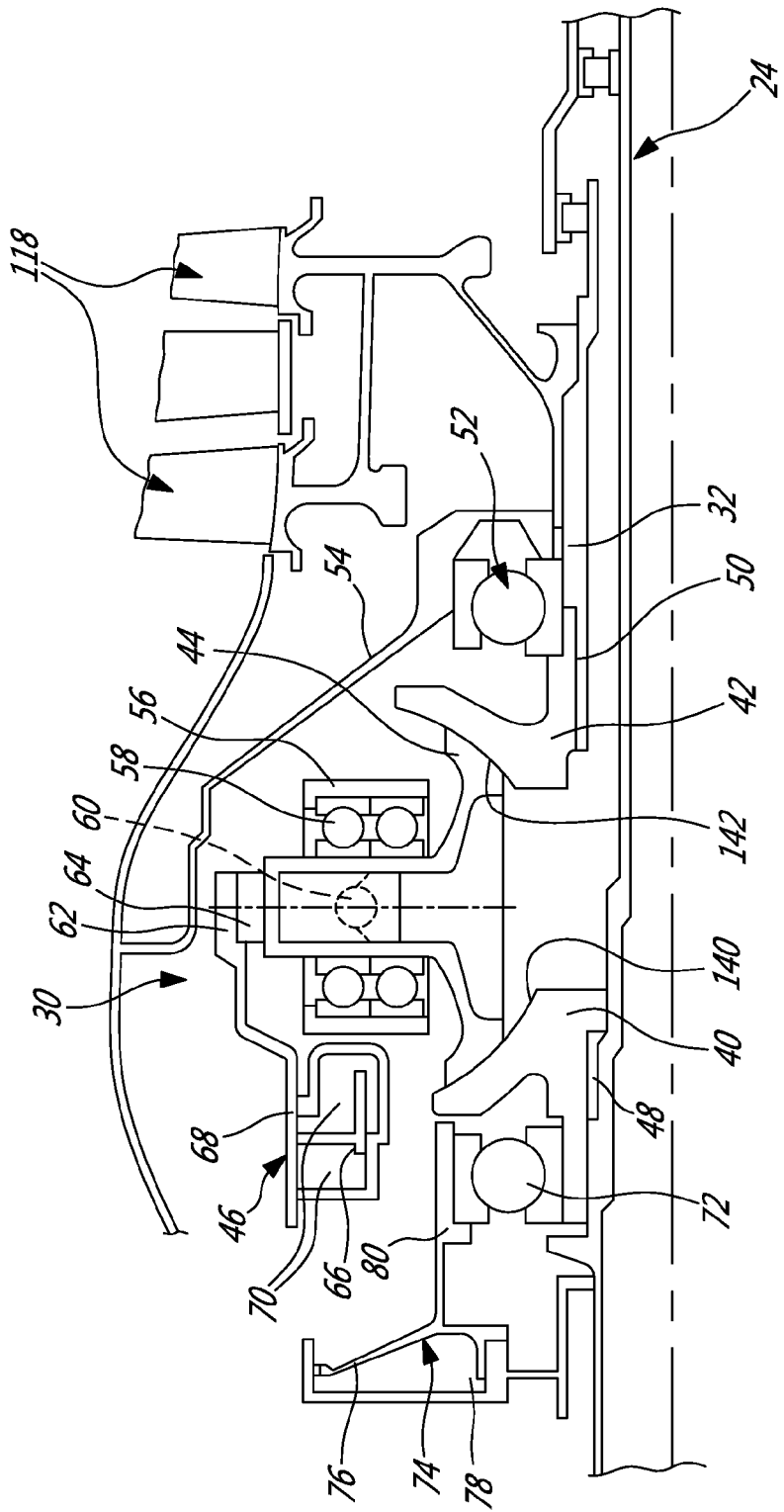
FIG. 4 is a schematic cross sectional view of a variable transmission of the gas turbine engine of FIG. 1, in accordance with a particular embodiment.
Figure 5:
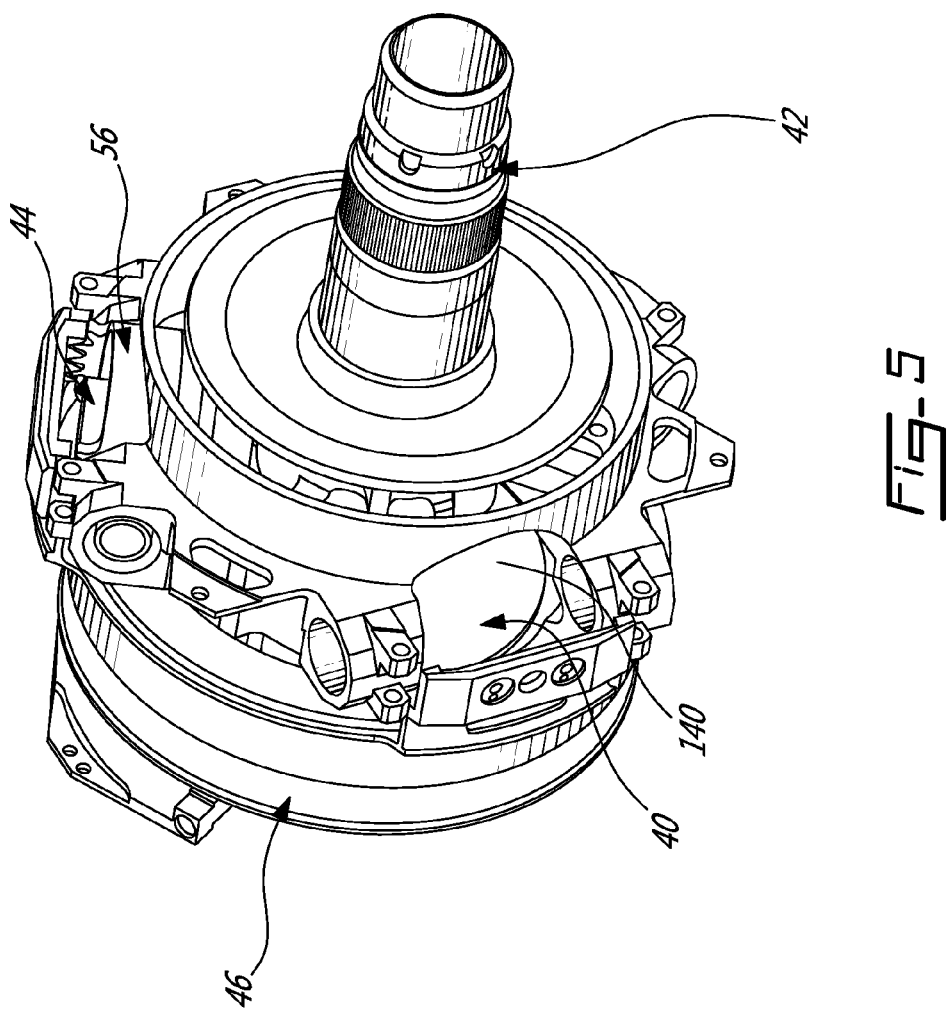
FIG. 5 is a schematic tridimensional view of part of the transmission of FIG. 4.
Figure 6:
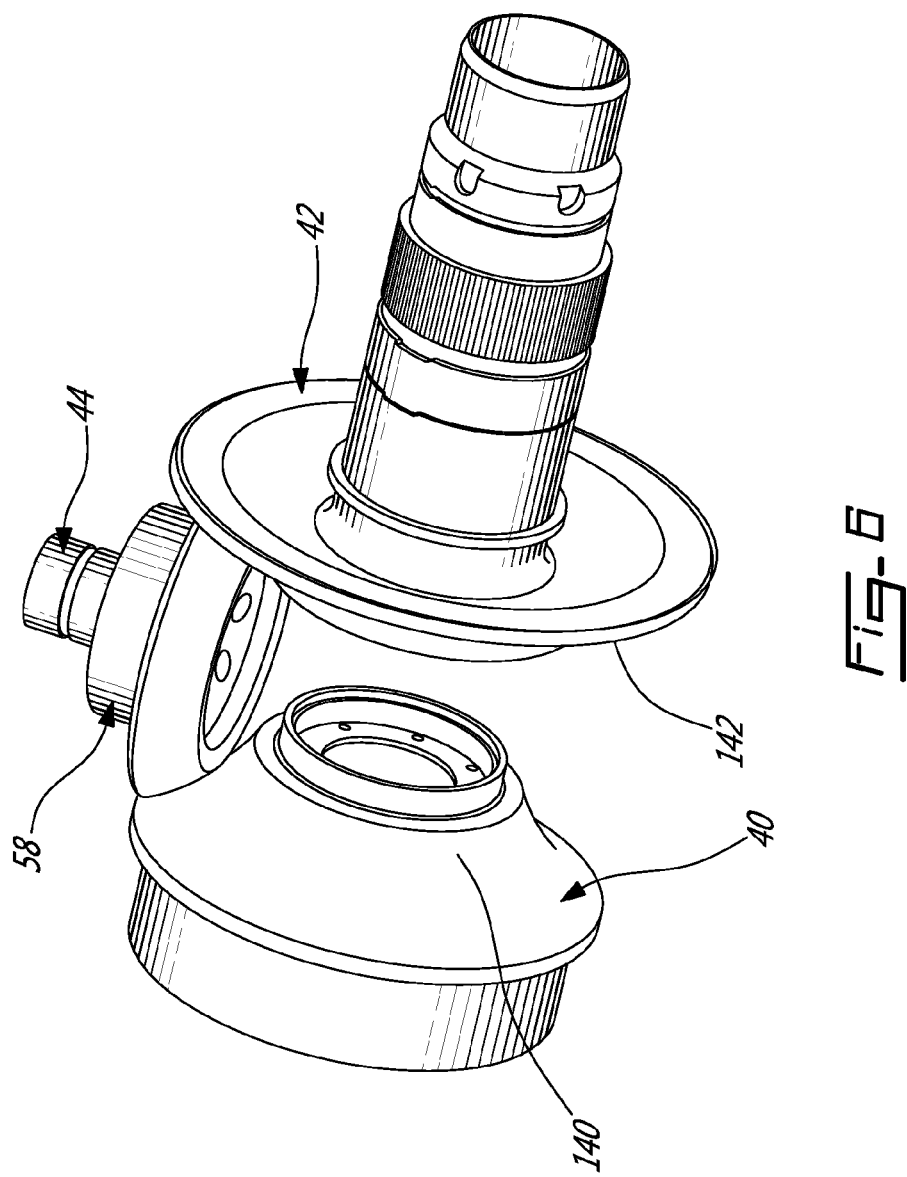
FIG. 6 is a schematic tridimensional view of an input drive member, a compressor member and a moveable member of the part of the transmission shown in FIG. 5.

Referring particularly to FIG. 4, the transmission shaft 32 and compressor drive member 42 are supported by a trust bearing 52 defining a rotatable connection between the transmission shaft 32 and a fixed bearing housing 54 which receives the transmission 30 therein. The transmission shaft 32 is also rotationally supported around the low pressure spool 24 by other bearing and associated support structure. In the embodiment shown, two low pressure compressor rotors 112 are directly connected to the transmission shaft 32. The compressor drive member 42 is directly connected to the transmission shaft 32 in a fixed relative position with respect thereto, for example through a keyed connection 50.

Still referring to FIG. 4, the input drive member 40 is supported by another trust bearing 72 defining a rotatable connection between the input drive member 40 and an axially extending wall 80 of an axial loading piston 74. The axial loading piston 74 is annular and includes a radial flange 76 defining a wall of an oil gallery 78, such that oil pressure in the oil gallery 78 presses the piston 74 toward the input drive member 40. The input drive member 40 is directly connected to the low pressure spool 24 such that they rotate at a same rotational speed, but through a connection 48 allowing for a relative movement along the axial direction. As such, movement of the axial loading piston 74 toward the input drive member 40 provides a bias ensuring that the toroidal surfaces 140, 142 are drivingly engaged with the idler discs 44.

Alternately, the compressor drive member 42 may be axially slidable with respect to the transmission shaft 32 and the input drive member 40 may be fixedly connected to the low pressure spool 24.

In the embodiment shown and with particular reference to FIGS. 4 and 7, the actuation mechanism 46 is provided as an annular piston. The piston 46 includes an annular axially extending outer wall 68, and an annular L-shaped flange 66 extending inwardly from the outer wall 68, with a radial portion of the flange 66 being connected to the outer wall 68. Referring to FIG. 4, the flange 66 is received in an annular cavity defining two oil galleries 70, one on each side of the flange 66. As such, a variation in the relative oil pressure in the galleries 70 produces a translation of the piston 46 along the axial direction of the engine 10. The oil pressure within the galleries is controlled by any appropriate type of control system, for example by the engine control unit, to vary the ratio of the transmission 30 to obtain the desired rotational speed for the low pressure compressor rotor(s) 112.

Still with particular reference to FIGS. 4 and 7, the piston 46 further includes three axially extending arm 62, one engaging a complementary portion 64 of each disc support 56. The engagement of the arm 62 and complementary portion 64 of the support 56 is offset from the axis of the pins 60, such that the translation of the piston 46 pivots the support 56 about the axis of the pins 60. In the embodiment shown in FIG. 7, the arm 62 and complementary portion 64 engage each other through a toothed engagement; other configurations are also possible.

Other configurations for the transmission 30 are also possible, provided they allow for a variation in the ratio between the rotational speed(s) of the low pressure compressor rotor(s) 112 and of the low pressure spool 24, and preferably a continuous variation thereof.

In a particular embodiment, the rotational speeds of the gas turbine engine are tuned according to the following. A rotational speed is selected for the high pressure compressor rotor(s) 114 and the high pressure turbine rotor(s) 118, for example to obtain a desired fuel consumption for the engine or based on a power demand on the engine. The high pressure compressor rotor(s) 114 are then rotated by the high pressure turbine rotor(s) 118 at the selected rotational speed through the high pressure spool 22. In a particular embodiment, the high pressure rotors 114, 118 and the high pressure spool 22 rotate at a same rotational speed.

A rotational speed is selected for the load 26, and the load 26 is rotated at the selected rotational speed by the low pressure turbine rotor(s) 120 through the low pressure spool 24. In a particular embodiment, the low pressure turbine rotor(s) 120 and the low pressure spool 24 rotate at a same rotational speed.

A rotational speed is selected for the low pressure compressor rotor(s) 112, for example based on desired performances (e.g. desired exhaust pressure) of the low pressure compressor 12. The variable ratio of the transmission 30 is then adjusted to rotate the low pressure compressor rotor(s) 112 at the selected speed with the low pressure turbine rotor(s) 120 through the low pressure spool 24. In a particular embodiment, the rotational speed of the load remains constant or substantially constant over a period of time, while the rotational speed of the low pressure compressor rotor(s) 112 is varied.

In the embodiment shown in FIGS. 4-7, the transmission ratio is adjusted by changing the orientation of the idler discs 44 in driving engagement with the two drive discs 40, 42. This is performed by varying the relative pressure between the two oil galleries 70 defined on opposed sides of the piston flange 66.

The transmission 30 may thus allow the rotational speed of the low pressure compressor rotor(s) 112 to be varied in a relatively wide range while keeping the rotational speed of the low pressure spool 24 within a relatively small range, by varying the transmission ratio to obtain the desired rotational speed of the low pressure compressor rotor(s) 112. The rotational speed of the low pressure compressor rotor(s) 112 can thus be tuned independently of the other rotatable members.

Accordingly, in a particular embodiment, the variation of the low pressure compressor rotor(s) 112 introduce a variability in the gas turbine thermodynamic cycle, which may allow to obtain a specific fuel consumption improvement by allowing the turbo machinery to operate closer to its optimum design point regardless of the power demand on the engine 10. For example, the rotational speed of the low pressure compressor rotor(s) 112 may be varied while keeping the rotational speed of the low pressure turbine rotor(s) 120 constant or substantially constant, for example in the case of a turboprop or turboshaft engine where the load typically runs at a discrete governed speed over a wide range of power, or in the case of generator engines where the load is typically constant. The transmission 30 may accordingly allow to optimize the performances and surge margin of the low pressure compressor 12, allowing the low pressure compressor rotor(s) 112 to rotate at an optimum speed independent of the required load speed.

In a particular embodiment, the load speed is controlled by the governor of the low pressure turbine rotor(s) 120 to match the requirements of the load, the independently rotatable spools 22, 24 allow the core engine to rotate at its own optimum speed and the variable transmission 30 allows the low pressure compressor rotor(s) 112 to be run at a speed independent of the load requirement; as such both the low pressure and high pressure compression sections 12, 14 may run on an efficient operating line.

Accordingly, the transmission may also allow for the high pressure section to be maintained at a more constant speed throughout the range of power demands. In a particular embodiment, the transmission 30 allows for the rotational speed of the high pressure turbine section 18 to be kept within a range of approximately from 80 to 100% of its optimal speed, by contrast with an equivalent engine having the low pressure compressor directly driven by the low pressure spool which typically has the high pressure turbine section rotating within a range of 50 to 100% of its optimal speed.

In a particular embodiment where the engine is a turbofan engines, the transmission 30 may allow for the low pressure or boost compressor rotor(s) 112 to rotate at a different speed than would result from a fixed ratio drive from the low pressure spool 24, which may allow for the reduction of bleed and the elimination of variable geometry on the low pressure compressor of certain high bypass engines by allowing for better management of the part load operation.

In a particular embodiment, active control of the ratio of the transmission 30 may also allow for the modification of the dynamic behaviour and/or thrust response of the engine 10.

In a particular embodiment where the engine is an APU, the variable transmission 30 may allow for the delivery pressure of the low pressure compressor section 12 to be matched to the aircraft requirement while allowing the power turbine section 20 to run at the required generator speed and the core engine to find its own optimum speed based on engine cycle part load matching behaviour.

Accordingly, the above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A method of adjusting a rotational speed of at least one low pressure compressor rotor of a gas turbine engine having independently rotatable low pressure and high pressure spools, the method comprising:
    rotating at least one rotor of a high pressure compressor of a core section of the engine with at least one rotor of a high pressure turbine of the core section through the high pressure spool;
    rotating at least one rotor of a low pressure turbine with a flow of exhaust gases from the high pressure turbine section;
    rotating the low pressure spool with the at least one rotor of the low pressure turbine;
    rotating a load of the engine with the low pressure spool;
    driving a rotation of the at least one low pressure compressor rotor with the low pressure spool through a continuously variable transmission defining a variable transmission ratio between rotational speeds of the at least one low pressure compressor rotor and of the low pressure spool, the continuously variable transmission including a first drive member coupled to the low pressure spool, a second drive member coupled to the at least one low pressure compressor rotor, at least one movable member drivingly engaged to the first and second drive members and having a relative position with respect to the first and second drive members, and an actuation mechanism connected to the at least one movable member; and
    adjusting the transmission ratio to obtain a desired rotational speed for the low pressure compressor rotor by varying the relative position of the at least one movable member with the actuation mechanism, the relative position determining a variable rotational speed ratio between the rotational speeds of the first and second drive members.

2. The method according to claim 1, wherein the load is rotated at a constant or substantially constant rotational speed.

3. The method according to claim 1, wherein the method is repeated over a period of time and the desired rotational speed and transmission ratio are varied over the period of time.

4. The method according to claim 1, wherein adjusting the transmission ratio includes changing an orientation of the at least one moveable member.

5. The method according to claim 4, wherein changing the orientation of the at least one movable member includes varying a relative pressure between two oil galleries defined on opposed sides of a part of a piston engaged to the moveable member.

6. The method according to claim 1, wherein the at least one rotor of the high pressure compressor, the at least one rotor of a high pressure turbine and the high pressure spool are rotated at a same rotational speed, and the at least one rotor of the low pressure turbine is rotated at a same rotational speed as that of the low pressure spool.

7. A method of adjusting rotational speeds of a gas turbine engine having independently rotatable low pressure and high pressure spools, the method comprising:
    selecting a first rotational speed for at least one high pressure compressor rotor and at least one high pressure turbine rotor of a core of the gas turbine engine;
    rotating the at least one high pressure compressor rotor with the at least one high pressure turbine rotor through the high pressure spool at the first rotational speed, a ratio between the first rotational speed and a rotational speed of the high pressure spool having a fixed value;
    selecting a second rotational speed for a load of the engine;
    selecting a third rotational speed for at least one low pressure compressor rotor of the engine; and
    adjusting a variable ratio of a continuously variable transmission including a first drive member coupled to the low pressure spool, a second drive member coupled to the at least one low pressure compressor rotor, at least one movable member drivingly engaged to the first and second drive members and having a relative position with respect to the first and second drive members, and an actuation mechanism connected to the at least one movable member, the variable ratio being adjusted to rotate the at least one low pressure compressor rotor at the third rotational speed while rotating the load at the second rotational speed with at least one low pressure turbine rotor of the engine through the low pressure spool, the variable ratio being adjusted by varying the relative position of the at least one movable member with the actuation mechanism, the relative position determining a variable rotational speed ratio between the rotational speeds of the first and second drive members, a ratio between the second rotational speed and a rotational speed of the low pressure spool having a fixed value.

8. The method according to claim 7, wherein the first rotational speed is selected to obtain a desired fuel consumption for the engine.

9. The method according to claim 7, wherein the first rotational speed is selected based on a power demand on the engine.

10. The method according to claim 7, wherein the method is repeated over a period of time and the second rotational speed remains constant while the third rotational speed is varied.

11. The method according to claim 7, wherein the third rotational speed is selected based on desired exhaust pressure of the low pressure compressor.

12. The method according to claim 7, wherein adjusting a variable ratio of the transmission includes changing an orientation of the at least one movable member.

13. The method according to claim 12, wherein changing the orientation of the at least one movable member includes varying a relative pressure between two oil galleries defined on opposed sides of a part of a piston connected to the moveable member.

14. The method according to claim 7, wherein the ratio between the first rotational speed and the rotational speed of the high pressure spool is 1, and the ratio between the second rotational speed and the rotational speed of the low pressure spool is 1.

15. A gas turbine engine comprising:
a core engine having at least one high pressure turbine rotor and at least one high pressure compressor rotor connected to a high pressure spool such as to be in driving engagement therewith, the high pressure spool being rotatable, a first fixed rotational speed ratio being defined between a rotational speed of the at least one high pressure turbine rotor and a rotational speed of the at least one high pressure compressor rotor;
a low pressure spool rotatable independently of the high pressure spool;
at least one low pressure turbine rotor connected to the low pressure spool such as to be in driving engagement therewith, a second fixed rotational speed ratio being defined between a rotational speed of the at least one low pressure turbine rotor and a rotational speed of the low pressure spool, the at least one low pressure turbine rotor in fluid communication with the at least one high pressure turbine rotor;
a rotatable load in driving engagement with the low pressure spool, a third fixed rotational speed ratio being defined between a rotational speed of the rotatable load and the rotational speed of the low pressure spool; and
a low pressure compressor rotor in fluid communication with the at least one high pressure compressor rotor, the low pressure compressor rotor being in driving engagement with the low pressure spool through a continuously variable transmission, the continuously variable transmission defining a variable rotational speed ratio between the rotational speed of the low pressure spool and a rotational speed of the low pressure compressor rotor, the continuously variable transmission including a first drive member coupled to the low pressure spool, a second drive member coupled to the low pressure compressor, at least one movable member drivingly engaged to the first and second drive members, and an actuation mechanism connected to the at least one movable member, the at least one movable member having a relative position with respect to the first and second drive members, the relative position being variable, the relative position determining a variable rotational speed ratio between the rotational speeds of the first and second drive members, and the actuation mechanism determining the relative position.

16. The engine as defined in claim 15, wherein the at least one high pressure turbine rotor and the at least one high pressure compressor rotor are directly connected to the high pressure spool such as to be rotatable therewith at a same rotational speed, and the at least one low pressure turbine rotor is directly connected to the low pressure spool such as to be rotatable therewith at a same rotational speed.

17. The engine as defined in claim 15, wherein the first and second drive members are defined as first and second drive discs with toroidal surfaces facing each other in a spaced apart manner, at least one of the first and second drive discs being axially moveable, the first and second drive discs being biased toward one another and in engagement with the at least one moveable member.

18. The engine as defined in claim 17, wherein the at least one movable member includes a plurality of idler discs each in driving engagement with the toroidal surface of each of the first and second drive discs, the actuation mechanism controlling an angle of the plurality of idler discs with respect to the toroidal surface of each of the first and second drive discs.

19. The engine as defined in claim 15, wherein the rotatable load is selected from the group consisting of a fan, a propeller and an output shaft.

* * * * *